Oct. 16, 1923.                                            1,470,668
H. O. HEM
TESTING MACHINE FOR PISTON RINGS AND THE LIKE
Filed Feb. 18, 1920
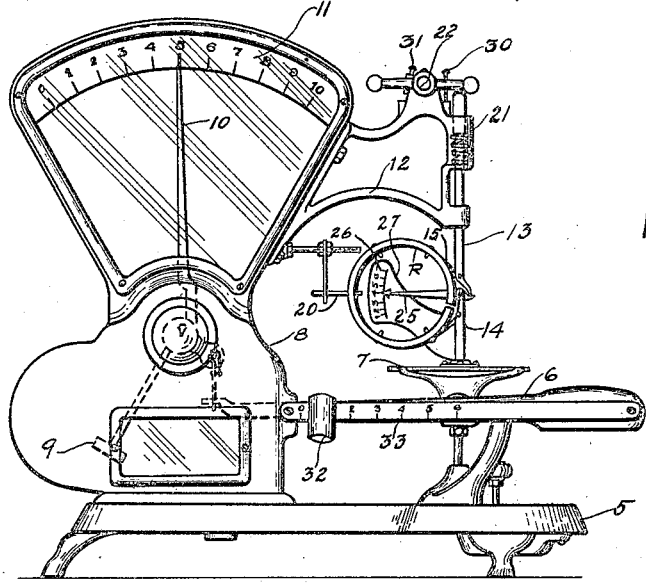
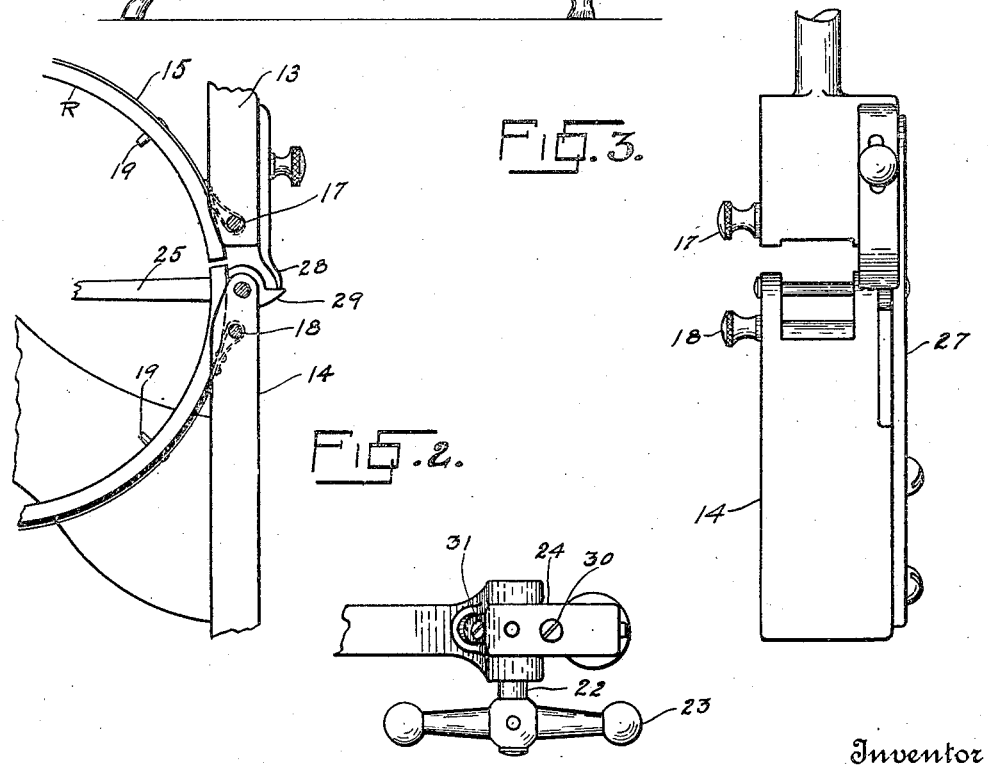
Inventor
Halvor O. Hem
By George R. Frye
Attorney Patented Oct. 16, 1923.

1,470,668

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

TESTING MACHINE FOR PISTON RINGS AND THE LIKE.

Application filed February 18, 1920. Serial No. 359,606.

*To all whom it may concern:*

Be it known that I, HALVOR O. HEM, a citizen of the United States, residing at Toledo, in the county of Lucas and State of Ohio, have invented certain new and useful Improvements in Testing Machines for Piston Rings and the like, of which the following is a specification.

This invention relates to testing machines for piston rings, and particularly to devices for measuring their expansibility or the expansive force exerted by them when compressed to predetermined dimensions corresponding, for example, to those of the cylinder in which the rings are intended to be employed. In airplane and automobile motors it is necessary for gas tightness and proper lubrication that all the piston rings used in the same cylinder engage the cylinder walls with approximately the same expansive force, and it is desirable for proper balance of the engine that the frictional resistance in each cylinder be the same and that the force with which the rings press against the cylinder walls be not so great as to cause excessive friction or prevent proper lubrication, while at the same time it must be great enough to prevent leakage.

The principal object of this invention is the provision of a simple and efficient device by means of which the expansive force exerted by piston rings when compressed to within the dimensions of an engine cylinder may be tested.

Another object is to provide a ring compressing member which engages the major part of the outer surface of the ring so that substantially every part of the ring is flexed as it is compressed and the condition of compression in which it is placed when in a cylinder is closely approximated.

Other objects and advantages will be apparent from the following description, in which reference is had to the accompanying drawings illustrating a preferred embodiment and in which similar reference numerals designate similar parts throughout the several views.

In the drawings:—

Figure 1 is a side elevation of a piston ring testing machine embodying my invention;

Figure 2 is an enlarged fragmentary elevation showing a detail of the ring compressing mechanism;

Figure 3 is a side elevation of the same; and

Figure 4 is an enlarged fragmentary plan view showing the operating handle.

My improved testing machine preferably includes automatic scale mechanism with a ring compressing device mounted directly above the platform thereof, and the automatic indicating mechanism of such scale is used to indicate the expansive force of piston rings placed in the ring compressing device. It will be understood that the particular type of automatic scale herein illustrated is selected merely for the purpose of illustration and that my improved mechanism can be used upon other forms and types of automatic scales. The particular type herein chosen, however, is well adapted for the purpose of illustrating the operation of my testing mechanism, and because that type of scale is well known through extensive commercial use and a considerable number of prior patents, for example, the De Vilbiss Reissue Patent No. 12,137, dated July 28, 1903, it will not be necessary to give a detailed description of the scale mechanism. In the illustrated embodiment 5 designates a suitable base above which is fulcrumed a scale beam 6 supporting a scale pan or platform 7 and connected within the housing 8 with pendulum counterbalancing mechanism 9, to which is connected an indicator hand 10 which swings over a graduated chart 11 inscribed with suitable indications to show in pounds and ounces the expansive force of rings placed in the ring compressing device. It will be understood that piston rings when free are normally of greater diameter than when inserted in the grooves of an engine piston and placed within a cylinder and that they tend when in the cylinder to expand outwardly, thus maintaining the closest possible fit with the inner cylinder wall. It is to determine the amounts of expansive force that would be exerted by these piston rings when in position within the cylinder that my testing device is designed.

In the embodiment illustrated there is secured to the inside of the housing 8 a bracket 12 which projects outwardly therefrom and supports a vertically-movable thrust rod 13 directly over the center of the platform 7. An upright post 14 is suitably secured upon the platform in alignment with the thrust rod 13, and adjacent their ends the rod and post are grooved on the sides toward the housing 8 to receive the ends of a flexible metallic band 15 of suitable length to surround a piston ring R. The band 15 is connected to the thrust rod 13 and post 14 by means of removable pins 17 and 18 so that it may be replaced by a longer or shorter band when piston rings of other sizes are to be tested. In order to facilitate positioning the ring, the band 15 is provided with a plurality of inwardly-projecting studs 19, and displacement of the band 15 is prevented by means of an adjustably-mounted stop arm 20.

The thrust rod 13 is normally held in raised position by means of a small spring 21, and when the arm is so raised the band 15 is sufficiently distended so that a piston ring may be readily placed in position to be tested.

Journaled in the upper portion of the bracket 12 is a rock shaft 22 having a handle 23 and an arm 24 fixed thereto. The arm 24 rests upon the upper end of the thrust rod 13 so that as the handle is turned in a clockwise direction the thrust rod is pressed downwardly against the tension of the spring 21.

It is important that the expansive force of the rings be tested when they are compressed to exactly the same size. In order to indicate the limits within which a ring has been compressed a hand 25 is pivoted to the upper end of the post 14 to swing over a graduated arc 26 carried by a plate 27 secured to the side of the post 14. The thrust rod 13 is provided with an adjustable finger 28 which engages an extension 29 of the hand 25 and swings the hand upwardly over the arc 26 as the thrust rod is depressed. The size to which the ring is compressed can thus be gaged with great nicety.

The arm 24 is provided with stop screws 30 and 31. When the band 15 has been contracted to the proper size, the screw 30 may be turned down against the shoulder on the bracket 12 and thereafter as each ring is tested the handle may be turned until the screw engages the shoulder. Unusual stiffness or flexibility of the ring will then result in an unusual position of both hands 10 and 25 so that only one hand need be carefully watched. If desired, an unsplit ring or a disk of proper size may be placed in the band while the finger 28 and screw 30 are being adjusted.

Since the weight of the piston ring is substantially supported by the platform 7, I have provided a sliding counter-poise 32 mounted on the beam 33 to counterbalance this weight. When the weight of the ring is counterbalanced the indicator hand 10 will stand at zero until force is applied by means of the handle 23 to compress the ring. When the ring is compressed its expansive force is exerted through the post 14, platform 7 and the lever 6 to swing the pendulum 9 upwardly until the force is offset by the pendulum. The expansive force is then directly indicated on the chart 11.

While it will be apparent that the illustrated embodiment of my invention herein disclosed is well calculated to adequately fulfill the objects primarily stated, it is to be understand that the invention is susceptible to variation, modification and change within the spirit and scope of the subjoined claims.

Having described my invention, I claim:

1. In a device of the class described, in combination, a flexible band adapted to surround a compressible body, means for axially positioning said body in said band, means for tightening said band about said body and thereby applying compressive force thereto, and means for measuring the expansive force exerted by the body under compression.

2. In a device of the class described, in combination, a flexible band adapted to surround a compressible body, a series of studs secured to said band for axially positioning such body in said band, means for tightening said band about said body and thereby applying compressive force thereto, and means for measuring the expansive force exerted by the body under compression.

3. In a device of the class described, in combination, a pair of relatively movable members, means for indicating the relative positions of said members, a flexible band having its ends connected respectively to said members, means for moving one of said members, and a force measuring device connected to the other of said members.

4. In a device of the class described, in combination, a pair of members movable toward each other, a flexible band having its ends connected respectively to said members, means for moving one of said members, adjustable means for limiting such movement to a predetermined extent, and force measuring means connected to the other of said members.

5. In a testing device of the class described, in combination, a pair of members movable toward each other in a testing operation, means for indicating the relative positions of said members, a flexible band having its ends connected respectively to said members, and force measuring means connected to one of said members.

6. In a device of the class described, in combination, a pair of members movable toward each other, means for indicating the relative positions of said members, a flexible band having its ends connected respectively to said members, means for moving one of said members, adjustable means for limiting such movement to a predetermined extent, and force measuring means connected to the other of said members.

7. In a device of the class described, in combination, a vertically-movable member, means yieldably holding said member in elevated position, means to depress said member, force measuring means, and connections between said force measuring means and said vertically-movable member including a flexible band adapted to compressively surround a body to be tested.

8. In a device of the class described, in combination, a vertically-movable member, means yieldably holding said member in elevation position, a lever for depressing said member, means for limiting the movement of said lever, force measuring means, and connections between said force measuring means and said vertically-movable member including a flexible band adapted to compressively surround a body to be tested.

HALVOR O. HEM.

Witnesses:
C. E. WILCOX,
C. O. MARSHALL.